US012088690B2

(12) United States Patent
Eastlake, III

(10) Patent No.: US 12,088,690 B2
(45) Date of Patent: Sep. 10, 2024

(54) METHOD FOR ROBUST COMMUNICATION BETWEEN NODES THAT ARE ADJACENT AT LAYER 3

(71) Applicant: Huawei Technologies Co., Ltd., Shenzhen (CN)

(72) Inventor: Donald Eggleston Eastlake, III, Apopka, FL (US)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/886,308

(22) Filed: Aug. 11, 2022

(65) Prior Publication Data
US 2022/0394114 A1 Dec. 8, 2022

Related U.S. Application Data

(63) Continuation of application No. PCT/US2021/017600, filed on Feb. 11, 2021.

(60) Provisional application No. 62/975,004, filed on Feb. 11, 2020.

(51) Int. Cl.
H04L 69/321 (2022.01)
H04L 45/24 (2022.01)
H04L 61/25 (2022.01)
H04L 101/622 (2022.01)
H04L 101/695 (2022.01)

(52) U.S. Cl.
CPC .......... *H04L 69/321* (2013.01); *H04L 45/245* (2013.01); *H04L 61/25* (2013.01); *H04L 2101/622* (2022.05); *H04L 2101/695* (2022.05)

(58) Field of Classification Search
CPC ..... H04L 69/321; H04L 45/245; H04L 61/25; H04L 2101/622; H04L 2101/695; H04L 45/03; H04L 45/02; H04L 45/26; Y02D 30/00
See application file for complete search history.

(56) References Cited

U.S. PATENT DOCUMENTS

| 9,843,496 | B2 | 12/2017 | Sato | |
| 11,388,060 | B1* | 7/2022 | Subramanian | G06F 13/28 |
| 2016/0269252 | A1 | 9/2016 | Manuguri et al. | |
| 2019/0288861 | A1* | 9/2019 | Andersson | H04L 61/5092 |
| 2019/0335386 | A1* | 10/2019 | Murray | H04L 43/0811 |

OTHER PUBLICATIONS

Congdon, P., et al., "802.1AB Overview Link Layer Discovery Protocol" IEEE 802.3 Frame Expansion Study Group, Ottawa, Sep. 30, 2004, 17 pages.

(Continued)

*Primary Examiner* — Charles C Jiang
*Assistant Examiner* — Shawn D Miller
(74) *Attorney, Agent, or Firm* — Conley Rose, P.C.

(57) ABSTRACT

A method for communication between nodes, where the method includes: constructing, by a first Layer 3 node, a link local control frame; adding, by the first Layer 3 node, a destination group Media Access Control (MAC) address to the link local control frame, wherein the destination group MAC address is outside a block of destination group MAC addresses assigned for Ethernet bridging purposes; and transmitting, by the first Layer 3 node, the link local control frame to a second Layer 3 node.

17 Claims, 5 Drawing Sheets

(56) References Cited

OTHER PUBLICATIONS

Haddock, S., "802.1AX—Link Aggregation:," Editor's Report: Jan. 2019, Version 3, 17 pages.
Thaler, P., et al., "IEEE 802.1Q Media Access Control Bridges and Virtual Bridged Local Area Networks," IETF 86—Tutorial, Mar. 10, 2013, 77 pages.
Congdon P., et al., "LSVR IETF Organizationally Specific TLVs for IEEE Std 802.1AB (LLDP)", LSVR, draft-congdon-lsvr-lldp-tlvs-00.txt, Oct. 22, 2019, 18 pages.
Lindem, A., et al., "BGP Logical Link Discovery Protocol (LLDP) Peer Discovery," Network Working Group, draft-acee-idr-lldp-peer-discovery-06, Nov. 21, 2019, 21 pages.
Richardson, M., "IPv6 over Link-Local Discovery Protocol", anima Working Group, draft-richardson-anima-ipv6-lldp-02, Dec. 18, 2019, 7 pages.
Perlman, R., et al., "Routing Bridges (RBridges) : Base Protocol Specification," Internet Engineering Task Force (IETF) Request for Comments: 6325, Standards Track, ISSN: 2070-1721, Jul. 2011, 99 pages.

\* cited by examiner

METHOD FOR ROBUST COMMUNICATION BETWEEN NODES THAT ARE ADJACENT AT LAYER 3

CROSS-REFERENCE TO RELATED APPLICATIONS

This application is a continuation of International Patent Application PCT/US2021/017600, filed on Feb. 11, 2021, which claims priority to U.S. Provisional Patent Application 62/975,004, filed on Feb. 11, 2020 and entitled, "Method for Robust Communication Between Nodes that are Adjacent at Layer 3." The aforementioned applications are hereby incorporated by reference in their entireties.

TECHNICAL FIELD

The present disclosure relates to discovery and communication protocols, and more particularly, to communication between nodes that are adjacent at the Layer 3 protocol level.

BACKGROUND

The Institute for Electrical and Electronics Engineers (IEEE) and other organizations specify protocols for networking, control, and discovery communication between nodes (also called stations) that are "adjacent" at a particular level. For example, IEEE 802.1 standards such as IEEE 802.1Q specifies bridging and different levels of bridging such as Customer Bridges and Provider Bridges. One such protocol is the Link Layer Discovery Protocol (LLDP) specified by IEEE 802.1AB. Another is the Link Aggregation Control Protocol (LACP) specified by IEEE 802.1AX. In IEEE 802, these protocols typically operate between bridges as specified in IEEE 802.1Q. However, these protocols can also be used between a bridge and an end station, or between two end stations.

SUMMARY

A first aspect relates to a method for communication between nodes. The method includes: constructing, by a first Layer 3 node, a link local control frame; adding, by the first Layer 3 node, a destination group Media Access Control (MAC) address to the link local control frame, where the destination group MAC address is outside a block of destination group MAC addresses assigned for Ethernet bridging purposes; and transmitting, by the first Layer 3 node, the link local control frame to a second Layer 3 node.

Optionally, in any of the preceding aspects, another implementation of the aspect provides that the destination group MAC address is configured to enable the link local control frame to be transparently forwarded by any intervening bridges or TRILL switches between the first Layer 3 node and a second Layer 3 node.

Optionally, in any of the preceding aspects, another implementation of the aspect provides that the destination group MAC address is a 48-bit multicast MAC address assigned under an Internet Assigned Numbers Authority (IANA) Organizationally Unique Identifier (OUI).

Optionally, in any of the preceding aspects, another implementation of the aspect provides that the block of destination group MAC addresses ranges from 0180C2000000 to 0x0180C20001FF.

Optionally, in any of the preceding aspects, another implementation of the aspect provides that the destination MAC address is outside a range from 0x0180C2000000 to 0x0180C2FFFFFF.

Optionally, in any of the preceding aspects, another implementation of the aspect provides that the link local control frame is a Link Layer Discovery Protocol (LLDP) frame or a Link Aggregation Control Protocol (LACP) frame.

Optionally, in any of the preceding aspects, another implementation of the aspect provides that the first and second Layer 3 nodes operate at Layer 3 of the International organization of Standardization (ISO) model, and that bridges operate at Layer 2 of the ISO model.

A second aspect relates to a network device for selecting a MAC address. The network device includes a storage device and a processor coupled to the storage device. The processor is configured to execute instructions on the storage device such that when executed, cause the network device to: construct, by a first Layer 3 node, a link local control frame; adding, by the first Layer 3 node, a destination group Media Access Control (MAC) address to the link local control frame, where the destination group MAC address is outside a block of destination group MAC addresses assigned for Ethernet bridging purposes; and transmit, by the first Layer 3 node, the link local control frame to a second Layer 3 node.

Optionally, in any of the preceding aspects, another implementation of the aspect provides that the destination group MAC address is configured to enable the link local control frame to be transparently forwarded by any intervening bridges or TRILL switches between the first Layer 3 node and a second Layer 3 node.

Optionally, in any of the preceding aspects, another implementation of the aspect provides that the destination group MAC address is a 48-bit multicast MAC address assigned under an Internet Assigned Numbers Authority (IANA) Organizationally Unique Identifier (OUI).

Optionally, in any of the preceding aspects, another implementation of the aspect provides that the block of destination group MAC addresses ranges from 0180C2000000 to 0x0180C20001FF.

Optionally, in any of the preceding aspects, another implementation of the aspect provides that the destination MAC address is outside a range from 0x0180C2000000 to 0x0180C2FFFFFF.

Optionally, in any of the preceding aspects, another implementation of the aspect provides that the link local control frame is a Link Layer Discovery Protocol (LLDP) frame or a Link Aggregation Control Protocol (LACP) frame.

Optionally, in any of the preceding aspects, another implementation of the aspect provides that the first and second Layer 3 nodes operate at Layer 3 of the International organization of Standardization (ISO) model, and that bridges operate at Layer 2 of the ISO model.

A third aspect relates to a network device for communication between nodes. The network device includes: means for constructing, by a first Layer 3 node, a link local control frame; means for adding, by the first Layer 3 node, a destination group Media Access Control (MAC) address to the link local control frame, wherein the destination group MAC address is outside a block of destination group MAC addresses assigned for Ethernet bridging purposes; and means for transmitting, by the first Layer 3 node, the link local control frame to a second Layer 3 node.

Optionally, in any of the preceding aspects, another implementation of the aspect provides that the destination group MAC address is configured to enable the link local control frame to be transparently forwarded by any intervening bridges or TRILL switches between the first Layer 3 node and a second Layer 3 node.

Optionally, in any of the preceding aspects, another implementation of the aspect provides that the destination group MAC address is a 48-bit multicast MAC address assigned under an Internet Assigned Numbers Authority (IANA) Organizationally Unique Identifier (OUI).

Optionally, in any of the preceding aspects, another implementation of the aspect provides that the block of destination group MAC addresses ranges from 0180C2000000 to 0x0180C20001FF.

Optionally, in any of the preceding aspects, another implementation of the aspect provides that the destination MAC address is outside a range from 0x0180C2000000 to 0x0180C2FFFFFF.

Optionally, in any of the preceding aspects, another implementation of the aspect provides that the link local control frame is a Link Layer Discovery Protocol (LLDP) frame or a Link Aggregation Control Protocol (LACP) frame.

Optionally, in any of the preceding aspects, another implementation of the aspect provides that the first and second Layer 3 nodes operate at Layer 3 of the International organization of Standardization (ISO) model, and wherein bridges operate at Layer 2 of the ISO model.

The disclosed techniques enable local communication between nodes that are adjacent at Layer 3 regardless of intervening bridges, which might otherwise disrupt such local communication. The disclosure specifies use of a media access control (MAC) address selected from a class of addresses that are transparent to the bridges. Therefore, when a frame containing the specified MAC address arrives at a bridge, the frame will be transparent to the bridge such that bridge forwards the frame rather than intercepts the frame. The disclosed techniques may be used in making Internet Protocol (IP) layer neighbor discovery and special control communications robust against intervening bridges.

For the purpose of clarity, any one of the foregoing implementation forms may be combined with any one or more of the other foregoing implementations to create a new embodiment within the scope of the present disclosure. These embodiments and other features will be more clearly understood from the following detailed description taken in conjunction with the accompanying drawings and claims.

DETAILED DESCRIPTION

Figure 1:
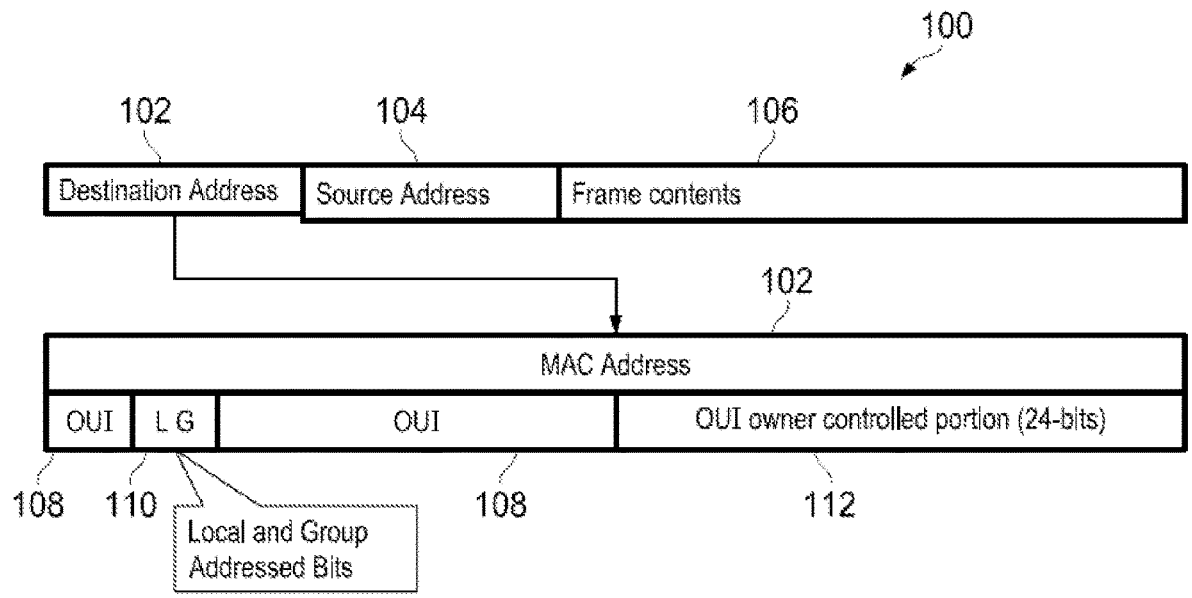
FIG. 1 depicts an Ethernet frame according to an embodiment of the disclosure.

In Ethernet networks, bridges may be used to relay or filter frames between two ports. IEEE 802 has defined a number of protocols that operate between adjacent Ethernet stations and bridges at Layer 2 (also known as the data link layer) of the International Organization of Standardization (ISO) model, such as LLDP (Link Layer Discovery Protocol) and LACP (Link Aggregation Control Protocol). LLDP and other such protocols may be useful between adjacent Layer 3 aware stations such as Internet Protocol (IP) routers and hosts or between IP hosts without an intervening router. Unless stated otherwise, layers discussed herein (e.g., Layer 2 or Layer 3) refer to those defined under the ISO model.

LLDP is a Layer 2 protocol providing for the unacknowledged announcement of information by an Ethernet station to other stations on the same Ethernet link. For example, LLDP enables a network device to advertise its identification, configuration, capabilities, and other information to neighboring devices in networks such as a local area network (LAN). Thus, LLDP allows network devices that operate at the lower layers of a protocol stack (e.g., Layer 2 bridges, switches, routers, and other stations) to learn some of the capabilities and characteristics of LAN devices.

There are proposals for using LLDP and other Layer 2 protocols between L3 aware stations such as between a host and its first hop IP router, or between adjacent IP routers. Examples include IETF Internet Draft draft-acee-idr-11dp-peer-discovery, IETF Internet Draft draft-congdon-1svr-11dp-tivs, and IETF Internet Draft draft-richardson-anima-ipv6-11dp. Another Layer 2 protocol is being developed in the IETF for discovery and liveness detection of Layer 3 devices (L3DL, IETF Internet Draft draft-ietf-1svr-13dl) and similar purposes. In addition, IEEE project 801.1ABdh may extend the LLDP standard such that stations can advertise larger quantities of information.

"Link local" Ethernet protocols such as LLDP frequently specify the level of the "link" over which they want to communicate through use of a destination media access control (MAC) address of the frames they send. Bridges intercept frames to certain MAC addresses, but the bridges are transparent to other MAC addresses (e.g., the presence and operation of bridges are transparent to network hosts communicating at Layer 3). Furthermore, it should be understood that there are multiple levels of bridges, such as Customer bridges and Provider bridges.

Communication between stations that are adjacent at the IP/Layer 3 could be disrupted if a lower layer bridge was introduced between those stations. For example, if such an intervening Layer 2 bridge tried to handle any of their local communication intended for a station adjacent at the Layer 3 level, that bridge might intercept frames exchanged between the Layer 3 stations. Disclosed herein are techniques to make LLDP and similar link local communication between Layer 3 stations that are adjacent at Layer 3 robust against the introduction of intervening bridges. To this end, a MAC address may be derived that is not from a block of bridging addresses that are traditionally recognized by bridges. Using a MAC address outside the bridging block can assure that intervening bridges will be transparent to frames addressed to the selected MAC address, thereby avoiding interference by such bridges. These and other features are detailed below.

Communication over Ethernet is generally carried out via packets called frames, an example of which is shown in FIG. 1. As shown in FIG. 1, an Ethernet frame 100 includes a destination MAC address 102, a source MAC address 104, and contents 106 of the Ethernet frame. The stations designated to receive a frame are indicated by the MAC destination address 102. Such addresses are structured into an Organizationally Unique Identifier (OUI) 108, "Local" (L)

and "Group (G) Addressed" bits 110, and 24 additional bits 112 making up the owner-controlled portion of the MAC address.

OUIs and extended unique identifiers (EUIs) are typically assigned to organizations such as network interface manufacturers, the Internet Assigned Numbers Authority (IANA) organization, the IEEE 802 LAN/metropolitan area network (MAN) Standards Committee, and other standards development organizations. For example, the OUI, 00-00-5E, has been assigned to the IANA. This includes $2^{24}$ EUI-48 multicast identifiers ranging from 01-00-5E-00-00-00 to 01-00-5E-FF-FF-FF, and $2^{24}$ EUI-48 unicast identifiers ranging from 00-00-5E-00-00-00 to 00-00-5E-FF-FF-FF.

The organization to which an OUI is assigned can specify the use of any MAC address with that OUI if the local bit is set to zero. All addresses with the local bit set to one are under local network administrator control. Typically, manufacturers of network interface hardware obtain an OUI and can then manufacture up to $2^{24}$ interfaces with unique MAC unicast addresses without fear of conflicts with other manufactures. Manufacturers can also purchase further OUTs if they exhaust that number of unique addresses.

48-bit MAC addresses are the most commonly used Ethernet interface identifiers, although 64-bit identifiers are in use for some networks and other lengths have been used or proposed such as 40-bit or 128-bit identifiers. The structure of an initial block of bits indicating the owner with L and G bits is used regardless of the length. 48-bit MAC addresses that are globally unique are also called EUI-48 identifiers. An EUI-48 is structured into an initial 3-octet OUT and an additional 3 octets assigned by the OUT holder or into a larger initial prefix assigned to an organization and a shorter sequence of additional bits so as to add up to 48 bits in total. For example, the IEEE has assigned Individual Address Blocks (TABs), where the first 4½ octets (36 bits) are assigned, giving the holder of the TAB 1½ octets (12 bits) they can control.

Communication between different levels of stations on links may be implemented using special destination MAC addresses, such as multicast addresses in which the local and group addressed bits 110 are set with L=0 and G=1. IEEE 802.1 specifies different multicast MAC addresses as destination addresses for LLDP frames and the like destined for different types of agents or bridges such as Customer and Providers Bridges, Two Port Mac Relay (TPMR) bridges, etc. A TPMR is a type of bridge that has only two externally-accessible bridge ports, and that is transparent to certain frame-based protocols. The destination MAC address may be fixed to one of the multicast MAC addresses shown in Table 1.

TABLE 1

| MAC Address | Destination Bridge |
| --- | --- |
| 0x0180C2000000 | Nearest Customer Bridge |
| 0x0180C2000002 | Nearest Bridge |
| 0x0180C2000003 | Nearest non-TPMR Bridge |
| 0x0180C2000008 | Nearest Provider Bridge |

An Ethernet frame destined for MAC address 0x0180C2000000 would stop at the nearest customer bridge, but pass through provider bridges and TPMRs. An Ethernet frame destined for MAC address 0x0180C2000002 would stop at the nearest bridge of any type, including a TPMR bridge. An Ethernet frame destined for MAC address 0x0180C2000003 would stop at the nearest customer or provider bridge, but not at a TPMR bridge.

For protocols such as LLDP, it is useful to use a standardized destination MAC address to avoid any requirement for prior negotiation between the sender and any receivers or the special configuration of sender and receiver with the address to be used. With a standardized MAC address, such as those in the table above for bridging or a standard selected MAC address for use between Layer 3 stations, the sender can immediately transmit data and the receivers will know what address to which they should listen to receive those transmissions.

Figure 2:
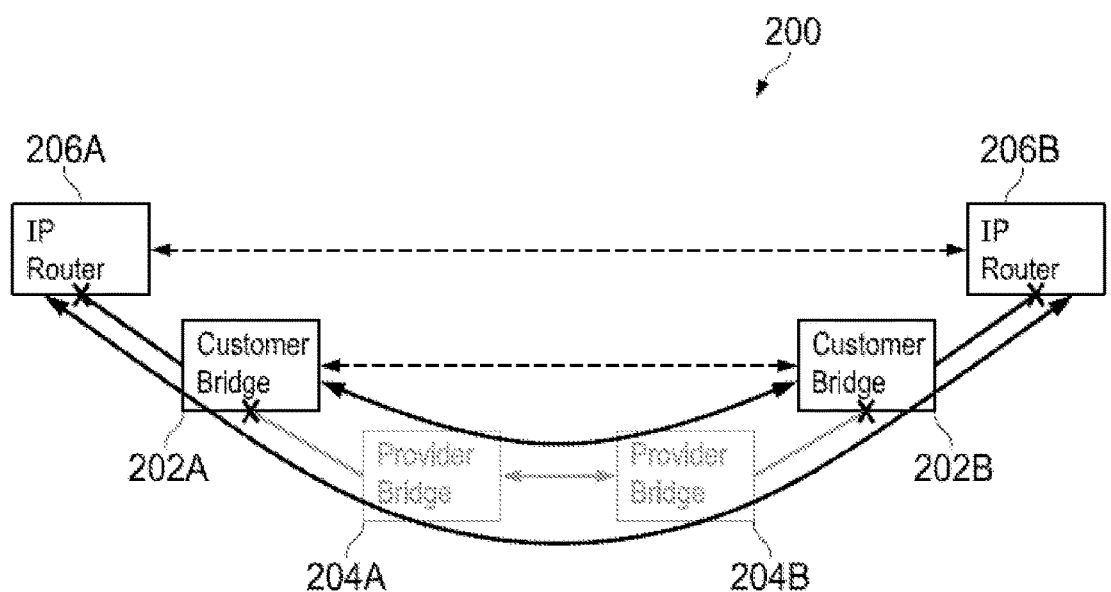
FIG. 2 depicts an Ethernet system according to an embodiment of the disclosure.

FIG. 2 depicts an Ethernet system 200 according to an embodiment of the disclosure. For discussion purposes, assume LLDP and similar protocol frames intended for the nearest customer bridge 202A or 202B are sent to a special destination MAC address (e.g., 0x0180C2000000). As shown in FIG. 2, such frames are passed through transparently by provider bridges 204A, 204B and are terminated by higher level (e.g., Layer 3) stations such as IP routers 206A, 206B. That is, IP routers 206A and 206B terminate communication of LLDP frames, but lower level stations transparently forward such LLDP frames. As discussed further with respect to FIG. 3, IP routers 206A, 206B do not normally forward frames addressed to any MAC address in a block of addresses (e.g., 0x0180C2000000 to 0x0180C200000F) used by bridges, while bridges normally forward frames outside that block of addresses. IP routers 206A, 206B also do not normally forward frames address to any MAC address in a block of addresses (e.g., 0x180C2000040 to 0x180C200004F) used by Transparent Interconnection of Lots of Links (TRILL) switches, while bridges normally forward such frames. The IETF has standardized the TRILL protocol (see IETF Request for Comments (RFC) 6325), which provides transparent Layer 2 forwarding using encapsulation with a hop count and Intermediate System to Intermediate System (IS-IS) link state routing.

It should be noted that FIG. 2 depicts a simplified architecture of a bridged Ethernet system 200. For example, while two customer bridges 202 and provider bridges 204 are shown, there could be more or fewer customer bridges 202 and/or provider bridges 204 in other implementations. Additionally, while only two levels of bridge are shown (customer and provider), IEEE 802.1Q specifies additional levels of bridges or switches that may be used in other implementations. In some implementations, one or more bridges may be deployed between an IP router 206A or 206B and a host (not shown) connected to that IP router. In some implementations, the Ethernet system 200 may include one or more TPMRs and/or TRILL switches. For example, an example hierarchy of such a system may be as follows: TPMR>provider bridge>customer bridge>TRILL switch>IP router.

Figure 3:
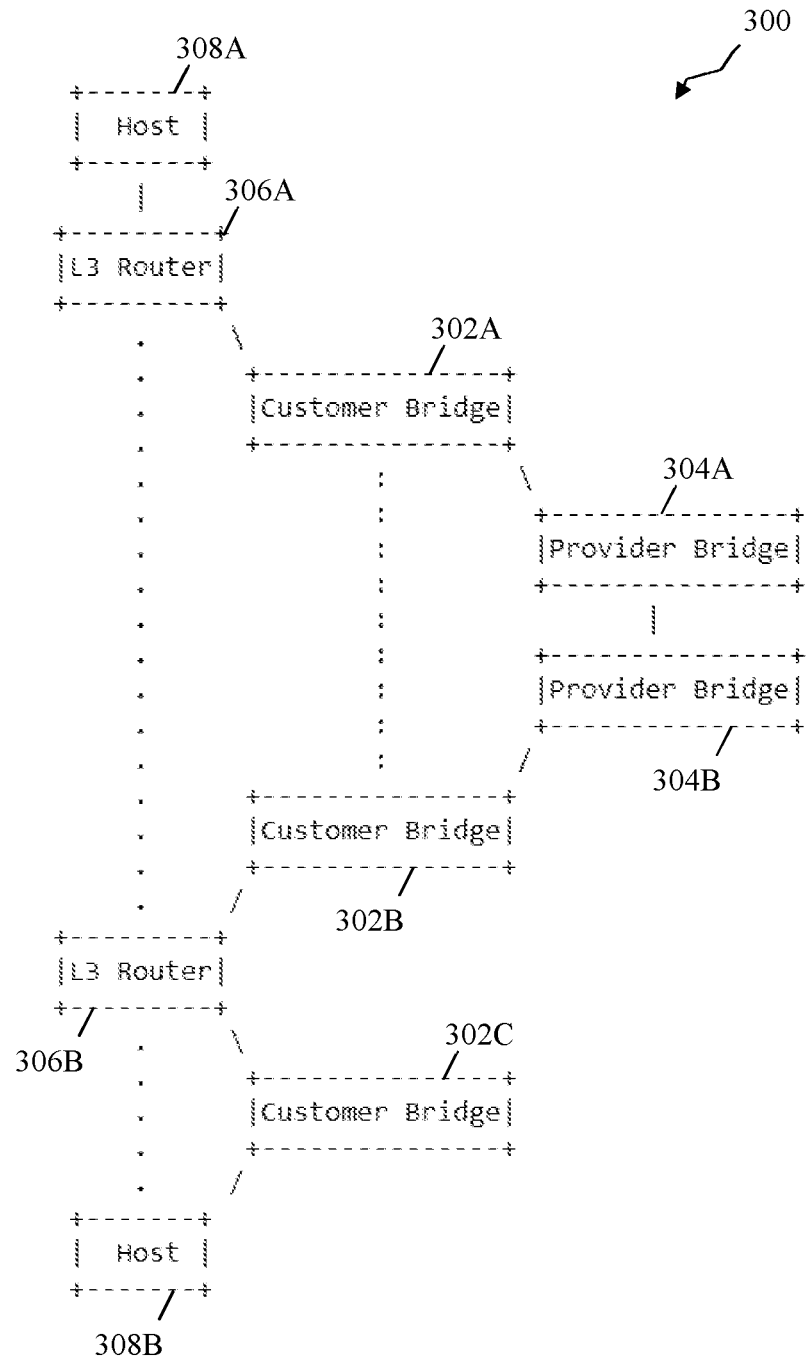
FIG. 3 depicts an Ethernet system according to an embodiment of the disclosure.

FIG. 3 depicts an Ethernet system 300 according to another embodiment of the disclosure. As illustrated in FIG. 3, using LLDP and similar protocols between Ethernet stations can have a scope of adjacency controlled by the multicast destination MAC address of the Ethernet frame 100 used to transmit an LLDP protocol data unit (PDU). LLDP PDUs sent inside Ethernet frames are identified by their destination MAC address (e.g., 01:80:C2:00:00:0E) and Ethertype (e.g., 0x88CC).

For discussion purposes, assume customer bridges 302A, 302B, and 302C use destination MAC address 0x0180C2000000 for LLDP and like communications. Frames sent to that address are transparently forwarded through any lower level bridges, such as the provider bridges 304A and 304B shown in FIG. 3. On the other hand, IP routers 306A and 306B do not forward frames sent to unknown multicast addresses unless configured to do so. Thus, frames sent to this address by the customer bridge 302C shown near the bottom of FIG. 3 will not reach either of the customer bridges 302A and 302B shown higher up due to the intervening IP router 306B.

For discussion purposes, assume provider bridges 304A and 304B use destination MAC address 0x0180C2000008 for LLDP and like communications. Frames sent to that address are transparently forwarded by lower level bridges (not shown in FIG. 3), but are terminated by higher level bridges such as customer bridges 302A-302C. These frames are also terminated by IP routers 306A and 306B.

It should be noted that FIG. 3 depicts a simplified architecture of a bridged Ethernet system 300. For example, where one or two customer bridges 302 or provider bridges 304 are shown, there could be more or less bridges in other implementations. In some implementations, one or more bridges may be deployed between the host 308A shown at the top of FIG. 3 and its first hop IP router 306A. Further, while only two levels of bridges are shown (customer and provider), IEEE 802.1Q specifies additional levels of bridges or switches that may be used in other implementations. Additionally, TRILL switches or devices specified in the future that are at a lower ISO level than IP might also be present.

In an embodiment, LLDP or similar protocols intended for communication between nodes (e.g., IP routers 306A and 306B) or between a host and its first hop IP router (e.g., 308A and 306A) may avoid using a destination MAC address that might be intercepted by any intervening bridge or TRILL switch. That is, adjacent Layer 3 nodes may use such protocols without disruption—even in the presence of intervening bridges or TRILL switches—by addressing each node to a destination MAC address outside of a block of bridging addresses reserved for this purpose.

The multicast destination MAC addresses used by bridges for protocols such as LLDP, LACP, and the like typically are selected from a block of addresses ranging from 0x0180C2000000 to 0x0180C200003F. To avoid disruption of communication between adjacent Layer 3 nodes by bridges, such nodes may use an address outside this block of addresses. In some embodiments, a more conservative approach may be employed using a MAC address outside a larger block of destination MAC addresses ranging, for example, from 0x0180C2000000 to 0x0180C2FFFFFF. A special MAC address meeting such requirements can be derived according to embodiments of the present disclosure.

In an embodiment, a special MAC address allocated under the IANA or IEEE 802 OUI can be used to assure no conflict with MAC addresses assigned to network interface manufacturers. This way, bridges will be transparent to Ethernet frames sent to such a MAC address, while IP routers or end stations configured to participate in the exchange of Layer 3 (or higher) communications can recognize the special MAC address and will assign each Ethernet frame to the appropriate protocol handler inside that IP router.

For example, one such special MAC address can include, 0x01005E900004, which as of the date of drafting of this application is an available group addressed MAC under the IANA OUI. However, it should be understood that the IANA may assign a different number (beginning with 0x01005E) as a special MAC address, e.g., due to other assignments or changes in the IANA's assignment policy. To obtain such a MAC address, the IANA may be requested to assign a 48-bit multicast MAC address (e.g., 0x00000E900004) under the IANA OUI for use with LLDP and similar protocols between Layer 3 routers, nodes, or the like. In some embodiments, IANA may be requested to assign more than one MAC address for different Layer 3 (or higher) purposes. Regardless of the number of addresses assigned, embodiments of the present disclosure propose selecting and standardizing a multicast MAC address outside the IEEE addresses blocks (e.g., 0x0180C2000000 to 0x0180C200000F). As such, bridges will treat this MAC address transparently (e.g., a frame containing the standardized MAC address will be forwarded by bridges without being intercepted), and under the IANA (or IEEE) OUI, this MAC address will not collide with any network interface manufacturer MAC address.

For example, a bridging address block may range from 0180C2000000 to 0180C200000F, or from 0180C2000020 to 0180C200002F. An address block for TRILL switches may range from 0180C2000040 through 0180C200004F. However, some bridging/Layer 2 related protocols may use numbers skipped over above or greater than 0180C200004F. Additionally, other blocks may be assigned to other standards organizations. Currently, the highest group address in use under the IEEE 802 OUI is 0180C20002FF, but it should be understood that values above this address could be allocated in the future. Nevertheless, embodiments of the present disclosure propose selecting and standardizing a multicast MAC address outside such IEEE address blocks.

Figure 4:
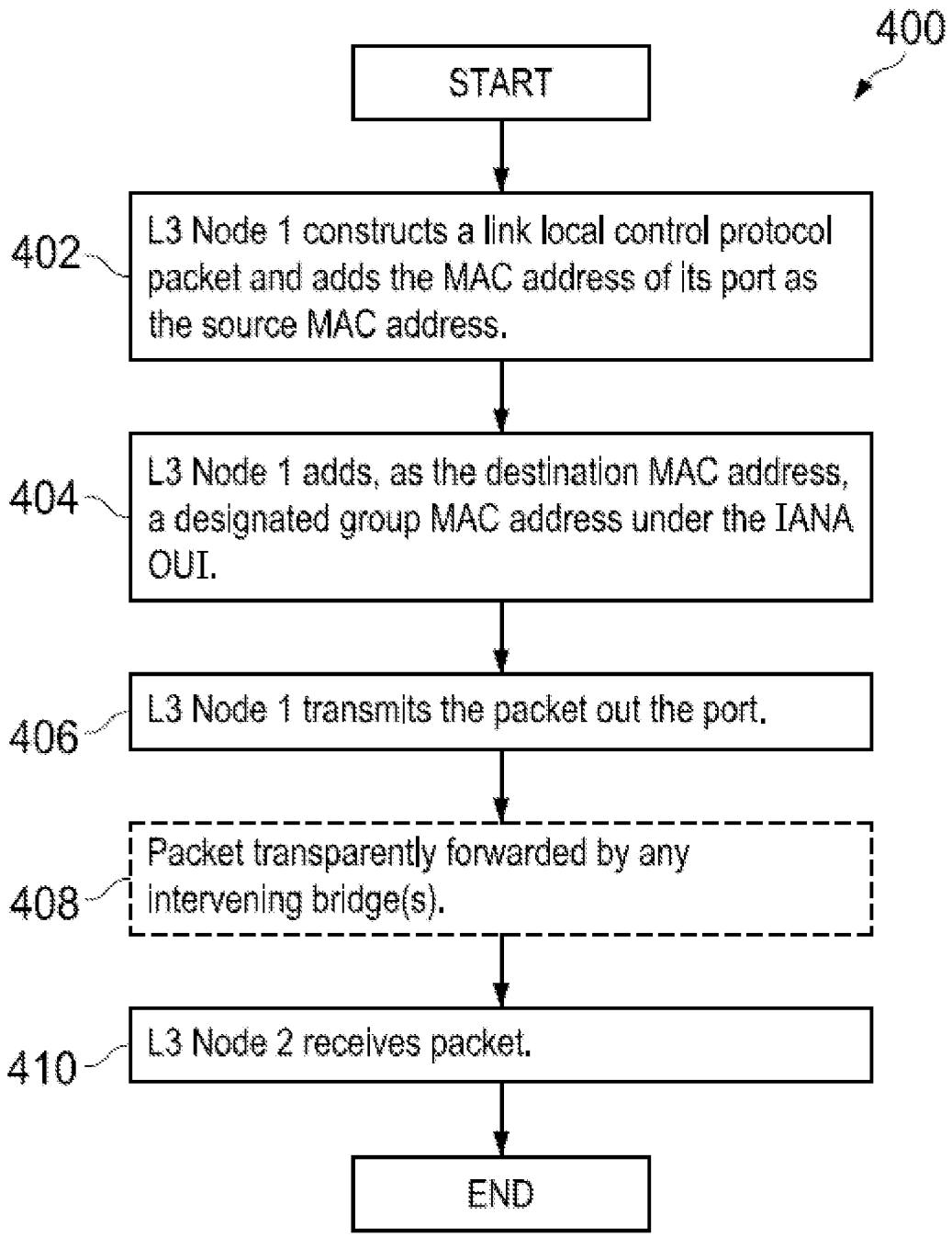
FIG. 4 is a flowchart of a Layer 3 communication method according to an embodiment of the disclosure.

FIG. 4 depicts a flowchart of a method 400 of communicating between adjacent Layer 3 nodes according to an embodiment of the disclosure. The operations in the method 400 may be performed in the order shown, or in a different order. Further, two or more the operations of the method 400 may be performed concurrently instead of sequentially.

At block 402, a Layer 3 node 1 constructs a link local control protocol packet and adds the MAC address of the Layer 3 node's port as the source MAC address (e.g., in field 104 of FIG. 1). The Layer 3 node 1 may be any station or device that operates at the Layer 3 protocol level or higher. For discussion purposes, assume that the Layer 3 node 1 is IP router 306A in FIG. 2, and that the packet is intended for another Layer 3 node 2 such as IP router 306B. At block 404, the Layer 3 node 1 adds a special destination MAC address (e.g., in field 102 of FIG. 1) selected according to embodiments of the disclosure. For example, this address may be a designated group MAC address assigned under the IANA OUI. For discussion purposes, assume 0x00000E900004 is the special MAC address added in block 404.

At block 406, the Layer 3 node 1 transmits the packet via its sending port. At block 408, the packet may be transparently forwarded by any intervening bridge(s) between the Layer 3 nodes (IP routers 306A and 306B in this case). As previously discussed, an intervening bridge such as customer bridge 302A in FIG. 3 would normally terminate such a packet if a traditional bridging group MAC address were used. That is, other approaches that use LLDP and similar protocols between IP routers provide no defense against intervening bridges.

However, because the special destination MAC address is outside the block of bridging group addresses (e.g., 0x0180C2000000 to 0x0180C200003F) traditionally used by bridges, intervening bridges will not intercept the packet from the Layer 3 node 1. Instead, any such bridges (e.g., customer bridges 302A, 304B, 304C and/or provider bridges 304A, 304B, or other types of bridges) will transparently forward the packet until it reaches its intended destination. At block 410, the Layer 3 node 2 (IP router 306B in this case) receives the packet, and may then assign the packet to an appropriate protocol handler inside the Layer 3 node 2 (IP router 306B in this case).

Figure 5:
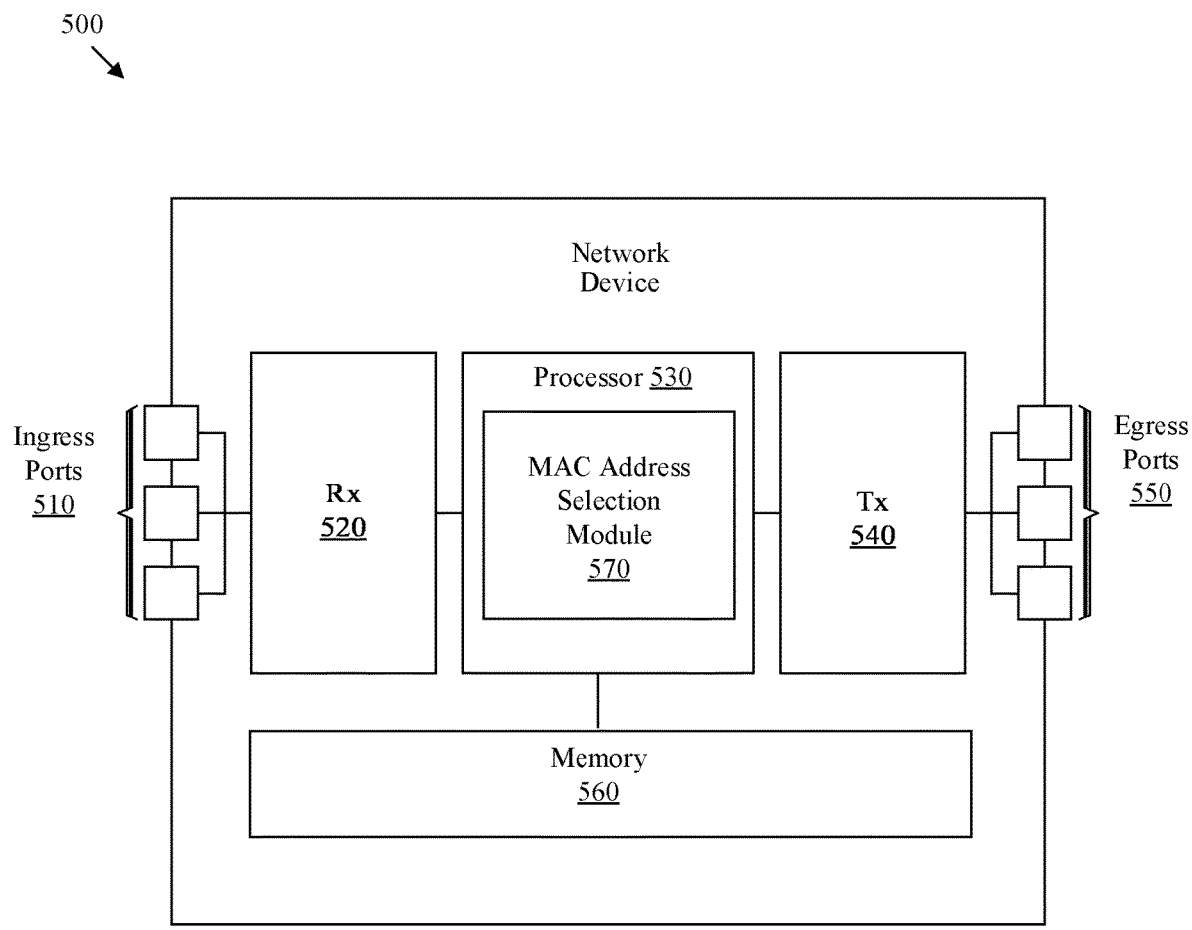
FIG. 5 is a schematic diagram of a network device according to an embodiment of the disclosure.

FIG. 5 is a schematic diagram of a network device 500 according to an embodiment of the disclosure. The network device 500 is suitable for implementing the components described herein. The network device 500 comprises ingress ports 510 and receiver units (Rx) 520 for receiving data; a processor, logic unit, or central processing unit (CPU) 530 to process the data; transmitter units (Tx) 540 and egress ports 550 for transmitting the data; and a memory 560 for storing the data. The network device 500 may also comprise optical-to-electrical (OE) components and electrical-to-optical (EO) components coupled to the ingress ports 510, the receiver units 520, the transmitter units 540, and the egress ports 550 for egress or ingress of optical or electrical signals.

In some embodiments, the network device 500 may connect to one or more bidirectional links. Additionally, the receiver units 520 and transmitter units 540 may be replaced with one or more transceiver units at each side of the network device 500. Similarly, the ingress ports 510 and egress ports 550 may be replaced with one or more combinations of ingress/egress ports at each side of the network device 500. As such, the transceiver units 520 and 540 may be configured to transmit and receive data over one or more bidirectional links via ports 510 and 550.

The processor 530 may be implemented by hardware and software. The processor 530 may be implemented as one or more CPU chips, cores (e.g., as a multi-core processor), field-programmable gate arrays (FPGAs), application specific integrated circuits (ASICs), and digital signal processors (DSPs). The processor 530 may be in communication with the ingress ports 510, receiver units 520, transmitter units 540, egress ports 550, and memory 560. The processor 530 comprises a destination MAC selection module 570. The module 570 may implement the disclosed embodiments described above. For instance, the module 570 may implement the method 200 of FIG. 2, the method 400 of FIG. 4, and processes discloses herein. The inclusion of the module 570 therefore provides a substantial improvement to the functionality of the device 500 and effects a transformation of the device 500 to a different state. Alternatively, the module 570 may be implemented as instructions stored in the memory 560 and executed by the processor 530.

The memory 560 comprises one or more disks, tape drives, and solid-state drives and may be used as an overflow data storage device, to store programs when such programs are selected for execution, and to store instructions and data that are read during program execution. The memory 560 may be volatile and non-volatile and may be read-only memory (ROM), random-access memory (RAM), ternary content-addressable memory (TCAM), and static random-access memory (SRAM).

Figure 6:
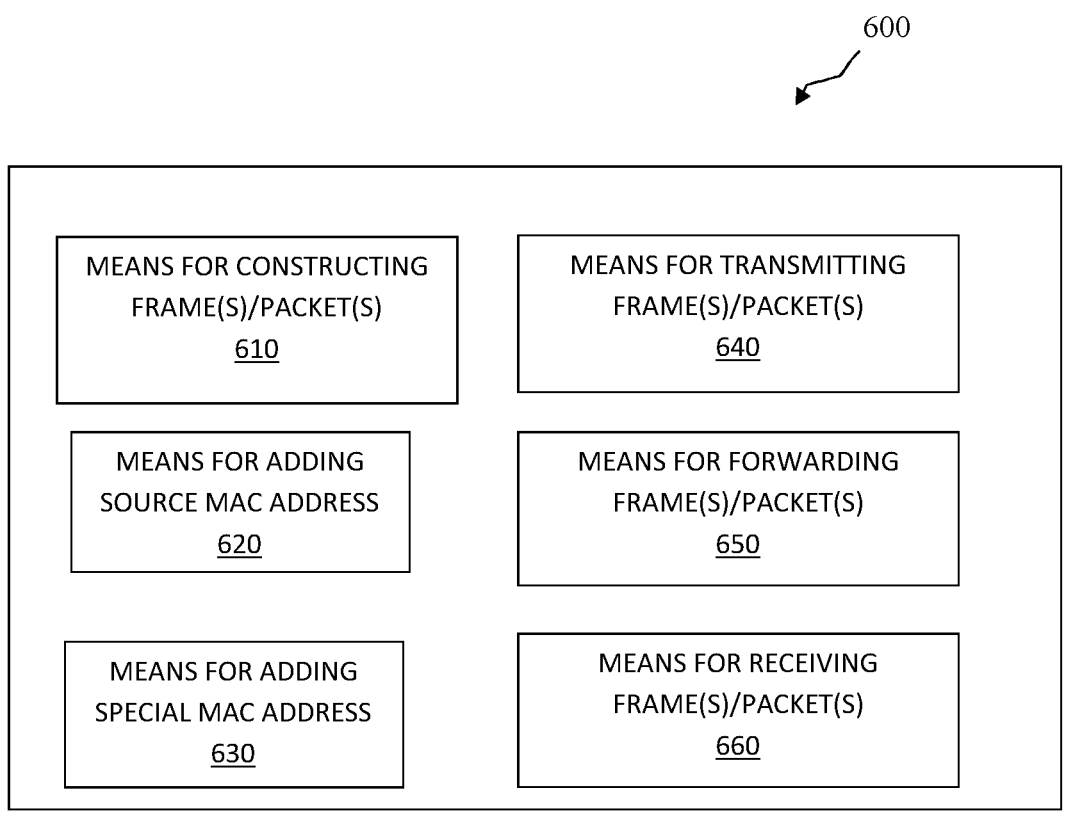
FIG. 6 is a schematic diagram of an apparatus for Layer 3 communication methods according to embodiments of the disclosure.

FIG. 6 is a schematic diagram of an apparatus 600 for selecting a destination MAC address according to various embodiments of the disclosure. The apparatus 600 may comprise: means 610 for constructing link local control protocol frames (e.g., an LLDP frame) or packets; means 620 for adding its source MAC address to the frame; means 630 for adding a selected group MAC address as the destination MAC address of the frame; and means 640 for transmitting the frame via a port (e.g., 550 of the apparatus). In some embodiments, the apparatus 600 may further comprise means 650 for forwarding packets and/or frames, and means 660 for receiving packets and/or frames.

Embodiments of the present disclosure make LLDP and similar link local communication between stations that are adjacent for IP robust against the introduction of intervening bridges. To this end, the present disclosure proposes embodiments for standardizing a group destination MAC address not used by bridges or TRILL switches, for example such as a MAC address assigned under the IANA OUI, for LLDP and similar protocols between stations that are adjacent at the Layer 3 protocol level of higher. This makes their communications robust against the introduction of well-behaved intervening bridges or TRILL switches that might otherwise intercept these communications if any of the traditional bridging or TRILL group MAC addresses were used. Using an appropriate MAC address outside the bridging/TRILL block assures that lower level nodes and intervening bridges will be transparent to frames so addressed.

Further, the techniques disclosed herein may be applied worldwide for any Layer 3 stations on a local link using the above-referenced protocols or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for communication between nodes, comprising:
    constructing, by a first Layer 3 node, a link local control frame;
    adding, by the first Layer 3 node, a destination group Media Access Control (MAC) address to the link local control frame, wherein the destination group MAC address is outside a range of destination group MAC addresses assigned for Ethernet bridging purposes, and wherein the destination group MAC address is configured to enable the link local control frame to be transparently forwarded by bridges operating at Layer 2 of the International Organization for Standardization (ISO) model between the first Layer 3 node and a second Layer 3 node or Transparent Interconnection of Lots of Links (TRILL) switches operating at Layer 2 of the International Organization for Standardization (ISO) model between the first Layer 3 node and a second Layer 3 node; and
    transmitting, by the first Layer 3 node, the link local control frame to the second Layer 3 node.

2. The method of claim 1, wherein the destination group MAC address is a 48-bit multicast MAC address assigned under an Internet Assigned Numbers Authority (IANA) Organizationally Unique Identifier (OUI).

3. The method of claim 1, wherein the range of destination group MAC addresses ranges from 0180C2000000 to 0x0180C20001FF.

4. The method of claim 1, wherein the destination MAC address is outside a range from 0x0180C2000000 to 0x0180C2FFFFFF.

5. The method of claim 1, wherein the link local control frame is a Link Layer Discovery Protocol (LLDP) frame or a Link Aggregation Control Protocol (LACP) frame.

6. The method of claim 1, wherein the first Layer 3 node and a second Layer 3 node operate at Layer 3 of the International Organization for Standardization (ISO) model.

7. A network device for communication between nodes, comprising:
- a storage device; and
- a processor coupled to the storage device and configured to execute instructions on the storage device such that when executed, cause the network device to:
  - construct, by a first Layer 3 node, a link local control frame;
  - add, by the first Layer 3 node, a destination group Media Access Control (MAC) address to the link local control frame, wherein the destination group MAC address is outside a range of destination group MAC addresses assigned for Ethernet bridging purposes, and wherein the destination group MAC address is configured to enable the link local control frame to be transparently forwarded by bridges operating at Layer 2 of the International Organization for Standardization (ISO) model between the first Layer 3 node and a second Layer 3 node or Transparent Interconnection of Lots of Links (TRILL) switches operating at Layer 2 of the International Organization for Standardization (ISO) model between the first Layer 3 node and a second Layer 3 node; and
  - transmit, by the first Layer 3 node, the link local control frame to the second Layer 3 node.

8. The network device of claim 7, wherein the destination group MAC address is a 48-bit multicast MAC address assigned under an Internet Assigned Numbers Authority (IANA) Organizationally Unique Identifier (OUI).

9. The network device of claim 7, wherein the range of destination group MAC addresses ranges from 0180C2000000 to 0x0180C20001FF.

10. The network device of claim 7, wherein the destination MAC address is outside a range from 0x0180C2000000 to 0x0180C2FFFFFF.

11. The network device of claim 7, wherein the link local control frame is a Link Layer Discovery Protocol (LLDP) frame or a Link Aggregation Control Protocol (LACP) frame.

12. The network device of claim 7, wherein the first Layer 3 node and a second Layer 3 node operate at Layer 3 of the International Organization for Standardization (ISO) model.

13. A network device for communication between nodes, comprising:
- means for constructing, by a first Layer 3 node, a link local control frame;
- means for adding, by the first Layer 3 node, a destination group Media Access Control (MAC) address to the link local control frame, wherein the destination group MAC address is outside a range of destination group MAC addresses assigned for Ethernet bridging purposes, and wherein the destination group MAC address is configured to enable the link local control frame to be transparently forwarded by bridges operating at Layer 2 of the International Organization for Standardization (ISO) model between the first Layer 3 node and a second Layer 3 node or Transparent Interconnection of Lots of Links (TRILL) switches operating at Layer 2 of the International Organization for Standardization (ISO) model between the first Layer 3 node and a second Layer 3 node; and
- means for transmitting, by the first Layer 3 node, the link local control frame to the second Layer 3 node.

14. The network device of claim 13, wherein the destination group MAC address is a 48-bit multicast MAC address assigned under an Internet Assigned Numbers Authority (IANA) Organizationally Unique Identifier (OUI).

15. The network device of claim 13, wherein the range of destination group MAC addresses ranges from 0180C2000000 to 0x0180C20001FF.

16. The network device of claim 13, wherein the destination MAC address is outside a range from 0x0180C2000000 to 0x0180C2FFFFFF.

17. The network device of claim 13, wherein the link local control frame is a Link Layer Discovery Protocol (LLDP) frame or a Link Aggregation Control Protocol (LACP) frame, wherein the first Layer 3 node and the second Layer 3 node operate at Layer 3 of the International Organization for Standardization (ISO) model.

* * * * *